United States Patent [19]
Rindal et al.

[11] Patent Number: 5,659,339
[45] Date of Patent: Aug. 19, 1997

[54] METHOD AND APPARATUS FOR REDUCING ELECTROMAGNETIC INTERFERENCE RADIATED BY FLAT PANEL DISPLAY SYSTEMS

[75] Inventors: Abraham E. Rindal, Dunedin, Fla.; Steven M. Kurihara, Palo Alto, Calif.

[73] Assignee: Sun Microsystems, Inc.

[21] Appl. No.: 315,599

[22] Filed: Sep. 30, 1994

[51] Int. Cl.⁶ .................................................. G09B 5/00
[52] U.S. Cl. .................................................. 345/212; 345/55
[58] Field of Search .................................. 348/820, 805; 345/212, 55, 213, 214; 315/85, 10, 381

[56] References Cited

U.S. PATENT DOCUMENTS

| | | | |
|---|---|---|---|
| 4,511,924 | 4/1985 | Griffis et al. | 348/737 |
| 5,107,188 | 4/1992 | Rindal | 315/370 |
| 5,157,308 | 10/1992 | Rindal | 315/85 |

*Primary Examiner*—Kee M. Tung
*Assistant Examiner*—Doon Chow
*Attorney, Agent, or Firm*—Flehr Hohbach Test Albritton & Herbert, LLP

[57] ABSTRACT

Electromagnetic interference ("EMI") generated by a flat panel video display system is reduced by periodically phase/modulating the panel clock. This spreads EMI energy associated with each panel clock harmonic by a frequency amount Δf proportional to the rate of phase change in the panel clock signal. EMI energy associated with each panel clock harmonic is reduced relative to a square-wave panel clock signal because the same energy is now spread over a group of frequencies centered about each harmonic. The phase of the panel clock is changed at a rate exceeding the bandwidth $f_m$ of a standard EMI measurement reference window. This disperses adjacent spectral energy sufficiently so the reference window measures but one, decreased, amplitude at a time. Phase-modulation may be achieved using a clock pulse dropping circuit that receives a square-wave input of frequency $Nf_c$ from a main oscillator, drops at least one clock pulse out of a stream of M clock pulses, and frequency divides the resultant waveform by N. The resultant panel clock will have two phases, wherein rate of phase change Δf is $Nf_c/2M$. The spectral spacing Δf of sidebands around each harmonic in the EMI spectrum changes as a function of Δf. Measured EMI is reduced when $\Delta f = Nf_c/2M > f_m$.

20 Claims, 7 Drawing Sheets

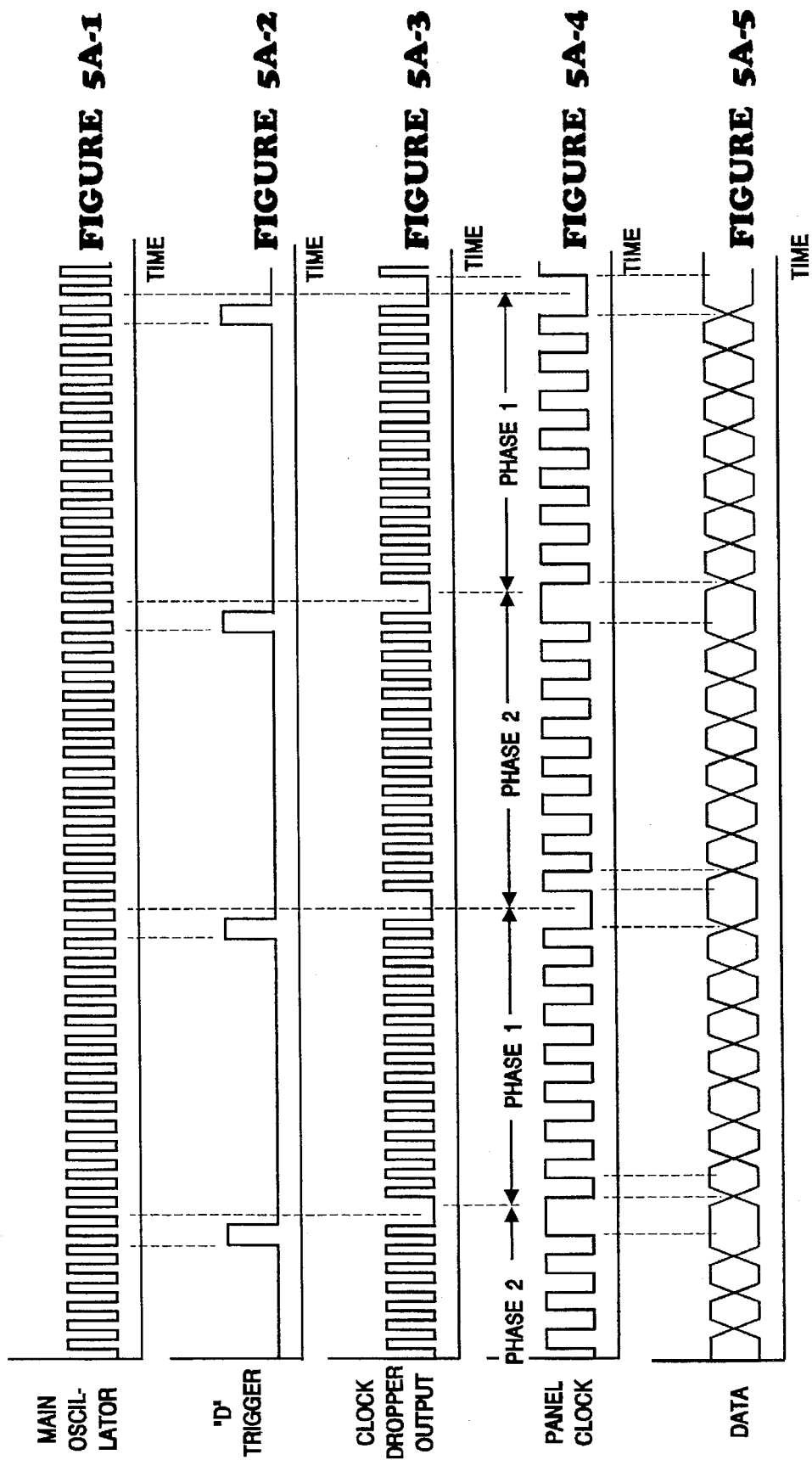

METHOD AND APPARATUS FOR REDUCING ELECTROMAGNETIC INTERFERENCE RADIATED BY FLAT PANEL DISPLAY SYSTEMS

FIELD OF THE INVENTION

The invention relates to reduction of electromagnetic interference radiated by electronic systems utilizing a rapidly switching clock signal, and more specifically to methods and apparatuses for reducing such radiation in video systems that include a flat panel display.

BACKGROUND OF THE INVENTION

Flat panel displays are used to display video information in a variety of applications, laptop computers, for example. While flat panel displays can advantageously provide a compact form factor, flat panel displays, like nearly all electronic systems, generate electromagnetic interference ("EMI"). Because EMI adds signals to an already congested radio spectrum, the amount of permissible EMI is subject to applicable governmental regulations.

The EMI-radiating performance of a system may be evaluated by measuring equipment emissions within a narrow frequency reference window at individual frequencies. In the United States, applicable Federal Communications Commission regulations dictate using a 120 KHz wide (e.g., $f_m$=120 KHz) standard reference measurement window that is swept from about 30 MHz to 1 GHz for purposes of making EMI measurement. Measurement involves a time integration of the spectral energy of the emissions occurring within the reference measurement window. The measured average emission magnitude at each frequency window is compared to published pre-specified limits, and a determination is made as to whether excessive EMI is being radiated. If excessive radiation is present, measures must be taken to bring the EMI-emitting system into compliance within acceptable emission limits.

It is known in the prior art to absorb or otherwise attenuate emitted EMI. It is also known to generate signals having less spectral energy that falls within the bandwidth of the EMI reference measurement window. These prior art techniques will now be described with respect to reducing EMI in a video display system.

FIG. 1 depicts a video flat panel display 10 and its display generator system 20, as well as several prior art techniques commonly used to reduce EMI-emissions 30 from the video flat panel display.

Display generator system 20 comprises a main oscillator 40 whose frequency is normally crystal controlled. The frequency of the main oscillator output signal is reduced by a frequency divider 50 and is then provided as input to a timing generator 60. Timing generator 60 further divides the main oscillator clock signal to generate a lower frequency panel clock signal 70. This panel clock signal is used to clock pixel brightness data out of a video frame buffer 80 via a data bus 90 to the flat panel display. The frame buffer data may be a single bit, or an entire word of data whose bits are clocked simultaneously.

Timing generator 60 also produces horizontal and vertical synchronization signals, 100, 110. These synchronization signals permit video panel display 10 to align incoming data received via data bus 90 with a particular (x, y) location on the display panel. As such, flat panel display 10 has no internal clocks or other time dependent element, and has no inherent time dependencies.

Data carried on bus 90 is displayed sequentially on flat panel display 10, with the displayed position of each pixel being determined by the number of clock pulses from a reference synchronization signal. In alternative implementations, the horizontal and vertical synchronization signals are replaced with explicit address lines to locate specific pixel positions. Such implementations permit data to be displayed in a more random fashion, somewhat analogously to accessing data within an integrated circuit random access memory.

Referring briefly to FIG. 2A, the panel clock signal typically is a periodic square wave pulse train, with a repetition frequency $f_c$ of about 5 MHz, and rise and fall transition times on the order of 2–4 ns. In most applications, the pixel data from frame buffer 80 is clocked over the data bus 90 to the flat panel display 10 on each rising edge of the panel clock signal. As shown, the rising edge of each panel clock signal is equidistant in time from the previous rising edge.

FIG. 2B is a frequency domain representation of the frequency spectra of the panel clock signal, which is to say the Fourier transform of the corresponding square-wave panel clock signal. Because the panel clock signal has relatively fast rise and fall times, the corresponding spectral amplitude will be rich in harmonics, centered about odd multiples of the base frequency $f_c$. Shown in phantom in FIG. 2B is the bandwidth of the reference window used for EMI-compliance testing. Because of the rapid 2–4 ns transition times, the time domain waveforms of FIG. 2A will, unfortunately, be rich in EMI. As a result, as the EMI standard reference window sweeps back and forth horizontally, along the frequency axis, there will be spectral energy at relatively high harmonics of $1f_c$, for example, at $10f_c$. In FIG. 2B, in the immediate vicinity of $1f_c$, the reference window will capture a component of EMI having amplitude A1. In the vicinity of the third harmonic $3f_c$, an EMI component of amplitude A3 will be present, and so forth.

Returning now to FIG. 1, it is known in the art to provide an EMI-reducing module 120 that includes low pass filters 130, and/or ferrite beads or other energy absorbing components 140. Such low pass filters and energy absorbing components may be useful in reducing differential mode and common mode EMI, respectively.

Low pass filters 130 may be implemented with conventional components such as operational amplifiers, resistors, capacitors, inductors. These filters typically have a cutoff frequency of about twice the fundamental frequency, or about 10 MHz for a 5 MHz panel clock frequency. As such, the lowpass filters attenuate some high frequency components from the panel clock and data bus signals, and can reduce EMI to a limited degree.

It is apparent from FIG. 2B that if all frequency components higher than $1f_c$ were removed by low pass filters 130, relatively little EMI energy would remain within the reference window bandwidth as it sweeps higher than $1f_c$. Unfortunately, however, such excessive low pass filtering would slow the panel clock and pixel data signals, compromising the ability of the flat panel to provide a meaningful display.

Further, low pass filtering can only be truly effective where the EMI signals are in a differential mode, e.g., where EMI is present on the panel clock and/or data bus signal wires, but is not present on the system ground 150. Those skilled in the art will appreciate that reducing the effective impedance of the system ground return 150 will reduce the EMI voltage drop resulting from EMI signal currents. Reducing the ground impedance can be a very effective method of reducing EMI.

In some application the EMI is common mode, e.g., carried on the panel clock wire, the data bus wire(s), and also on ground. It is known in the art to reduce common mode EMI by placing energy dissipating elements such as ferrites 130 in close proximity to such wires. The dissipating elements absorb the electromagnetic energy from the EMI, converting the energy into heat. The use of ferrite beads, cores, or other dissipating elements can effectively contain EMI to limited areas within an enclosure. However, the amount of EMI attenuation is relatively small, and other EMI-reducing techniques must also be used.

It is also known in the art to surround EMI-radiating equipment with a metal shield 160 that confines the radiation to the equipment. Shielding can be effective but can be costly and add to the system size. Further, effective shielding may impair system cooling, for example by reducing or eliminating ventilation openings.

A somewhat more sophisticated approach to reducing EMI is to replace the crystal controlled main oscillator 40 and frequency divider 50 within the display generator with a frequency slewable clock unit 170. More specifically, the output signal from a sweep generator 180 is coupled to the input of a voltage controlled oscillator 190. The output from the voltage controlled oscillator 190 is then presented as the input to the timing generator 60.

The purpose of the substitute clock unit 170 is to rapidly change the frequency provided by the timing generator 60. Sufficiently rapid changes reduce the amount of time that frequency components fall within the narrow EMI-compliance reference bandwidth. Since EMI measurements represent an integration of spectral energy over time, reducing the time that spectral components fall within the reference bandwidth will reduce their EMI contribution.

Unfortunately it is difficult to implement clock unit 170 as most modern digital clock circuitry is crystal controlled, and thus not appreciably slewable. Generally implementation of the sweep generator and VCO requires a customized integrated circuit, and thus represents additional cost to manufacture the display generator.

What is needed is a technique for reducing differential mode and common mode EMI in a display system that effectively reduces EMI without significant impact upon display performance. Preferably such technique should be capable of implementation using off-the-shelf components that do not add significantly to the cost of manufacturing a video display system. Further, such technique should not add significantly to the package size of the video display system, and should not hamper system cooling.

The present invention discloses such a technique.

SUMMARY OF THE PRESENT INVENTION

Electromagnetic interference ("EMI") associated with panel clock and data signals is reduced in a flat panel video display system by spreading-out the EMI-producing spectra. This is achieved by periodically phase-modulating the panel clock signal such that the panel clock signal comprises at least two phases. The rate of change between these phases determines the amount of frequency spreading in the Fourier transform of the panel clock signal. By changing phases at a rate exceeding the bandwidth ($f_m$) of a standard EMI reference window, adjacent spectra are separated by a sufficiently large frequency ($\Delta f$) as to fall outside the measurement window.

In this fashion, EMI energy is distributed among the harmonics and adjacent sidebands comprising the panel clock signal. Because the total energy associated with each harmonic is the root-mean-square sum of the harmonic and sidebands, each individual harmonic will have less amplitude than the corresponding harmonic for a conventional square-wave panel clock signal. Thus, EMI is reduced relative to the EMI amplitude associated with a conventional square-wave panel clock signal.

In the preferred embodiment, a square-wave clock signal of frequency $Nf_c$ is input to a clock dropping circuit that drops one pulse out of every M incoming clock pulses. The resultant intermediate signal is then input to a divide-by-N frequency divider that outputs a panel clock signal of frequency $f_c$ having first and second phases.

A first panel clock phase comprises unshifted pulses of frequency $f_c$. A second panel clock phase of frequency $f_c$ comprises pulses that are identical to the first phase pulses except they are shifted by $\phi$ relative to the first phase. In the preferred embodiment, a flip-flop divider implements the divide-by-N, with the result that $\phi=180°$. However, any non-zero phase shift $\phi$ will also suffice providing the phases are shifted at a sufficiently rapid rate such that $\Delta f > f_m$.

Proper selection of N, $f_c$ and/or M results in a sufficiently rapid rate of change between the phases such that $\Delta f$ can be made to exceed $f_m$. This permits the spectra of the panel clock signal to advantageously be spread by an amount $\Delta f = Nf_c/(2M)$. When $Nf_c/(2M) > f_m$, EMI measured with a standard reference window of bandwidth $f_m$ is reduced relative to measurement of EMI generated by a square-wave panel clock signal of like voltage amplitude. An electronic component other than a flat panel display coupled to such a clock signal will also emit reduced EMI.

Other features and advantages of the invention will appear from the following description in which the preferred embodiments have been set forth in detail, in conjunction with the accompanying drawings.

BRIEF DESCRIPTION OF THE DRAWINGS

FIG. 5A-1 depicts a main oscillator signal, according to the present invention;

FIG. 5A-2 depicts a "D" trigger signal, according to the present invention;

FIG. 5A-3 depicts a clock dropper output signal, according to the present invention;

FIG. 5A-4 depicts a panel clock signal, according to the present invention;

FIG. 5A-5 depicts a data signal, according to the present invention.

DETAILED DESCRIPTION OF THE PREFERRED EMBODIMENT

Figure 1:
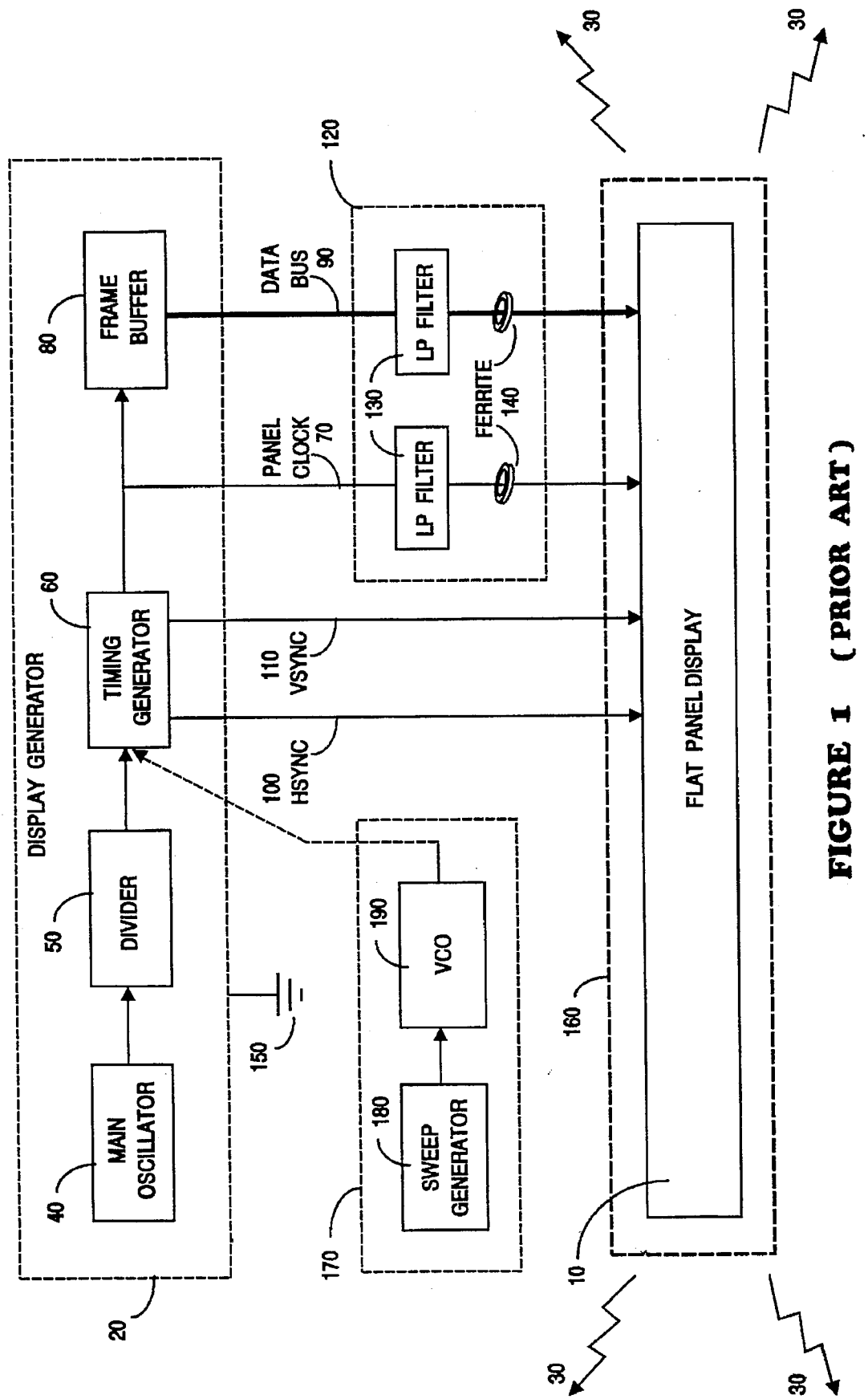
FIG. 1 is a block diagram of a flat panel video display system that includes EMI reducing techniques, according to the prior art.
Figure 3:
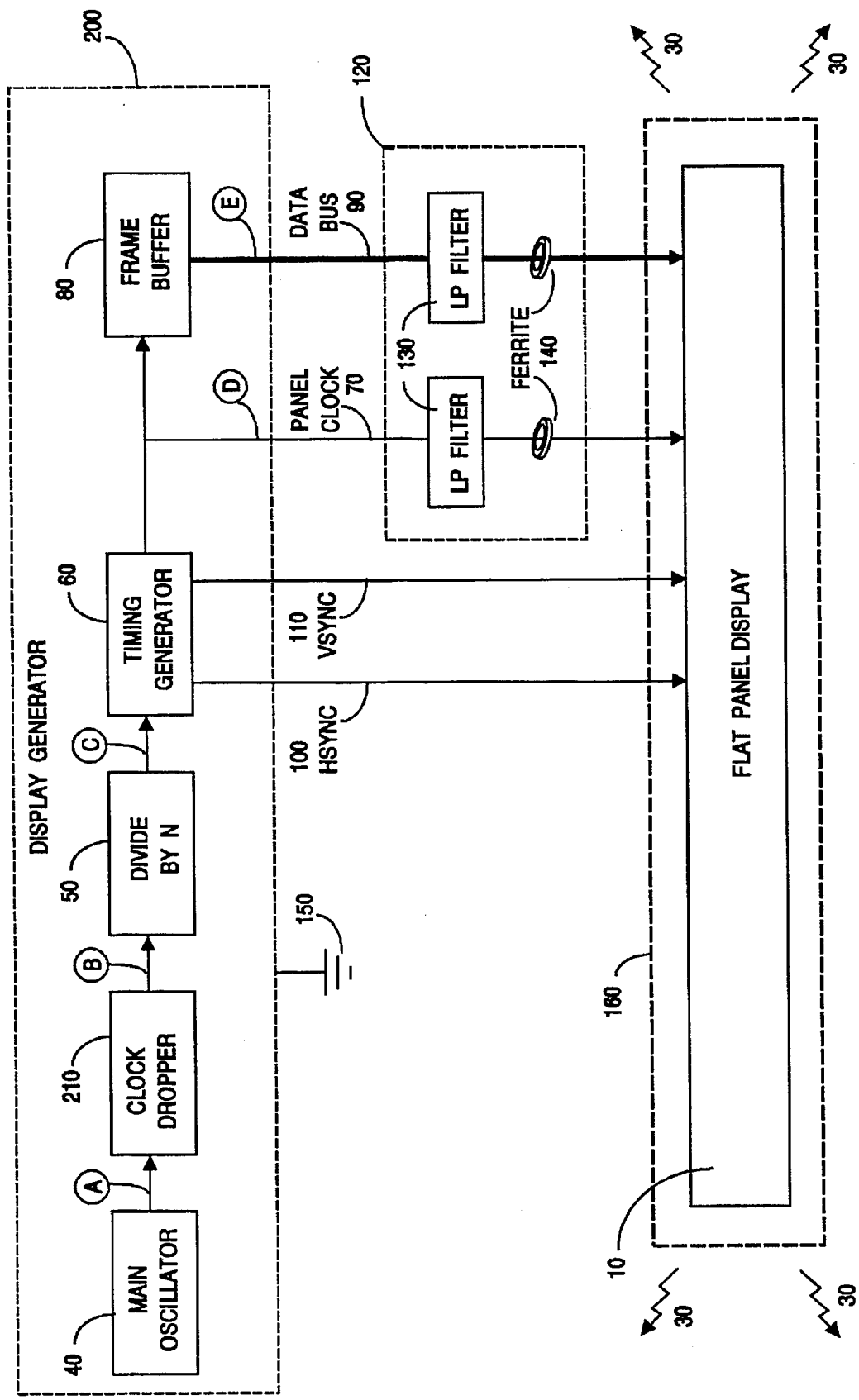
FIG. 3 is a block diagram of a flat panel video display system with reduced EMI, according to the present invention.

FIG. 3 is somewhat similar to the prior art flat panel display system of FIG. 1 except that a clock dropper circuit 210 is placed in series between the output of the main oscillator 40 and the input of a divide-by-N circuit 50. The clock dropper circuit drops one out of every M incoming main oscillator pulses, where M exceeds one. As indicated symbolically, EMI 30 generated by the present invention is diminished in amplitude relative to the EMI generated by the prior art system of FIG. 1.

While FIG. 3 shows low pass filters 130, ferrite components 140, and shielding 160, it is understood that any or all of these components may be omitted because of the reduced EMI emitted by flat panel display 10.

Operation of the clock dropper circuit 210 is best understood from FIG. 4 and FIG. 5A-1 through 5A-5. A typically $Nf_c=2\times 5$ MHz=10 MHz square-wave signal from the main oscillator 40 is coupled as input to an inverter gate 220, e.g., a 7404, and an AND gate 260, e.g., a 7408. The inverted square-wave is then coupled to the clock input of a four-bit binary counter 230, for example a 74161. A logic module 240 comprising inverters and AND gates recognizes (in the preferred embodiment) a binary count of 0110 from counter 230. The output of the logic module 240 is then coupled to the D-input of a flip-flop 250, for example an 7474.

With reference to FIGS. 3, 4 and 5A-1 and 5A-2, the main oscillator waveform is node A, and the output of the logic unit 240 is denoted as the "D" trigger signal. In this embodiment, the D trigger signal (FIG. 5A-2) is always 0 except when counter 230 has reached count $6_{10}$, which is $0110_2$. The $\overline{Q}$ output of flip-flop 250 is normally 1, but on clock pulse $7_{10}$, will be reset to 0 because the D-input is then a 1. The resultant signal at node B is the clock dropper output in FIG. 5A-3.

It is seen from FIG. 5A-3 that in the intermediate clock dropper output signal one out of every M=16 incoming main oscillator pulses was dropped. As such, the ratio of the period of the dropped pulses is M=16 relative to the period of $f_c$. A value of M other than 16 may be used, providing that the phase change rate $Nf_c/(2M)>f_m$, where $f_m$ is the standard EMI reference window bandwidth.

Returning to FIG. 3, the clock dropper output signal at node B is coupled to the input of a divide-by-N unit, whose output is coupled to the timing generator 50. In the preferred implementation the divide-by-N was implemented with a flip-flop 50 that divides by N=2. It is understood that divide-by-N unit 50 and the timing generator 60 may be identical to what was employed in the prior art configuration of FIG. 1.

Figure 4:
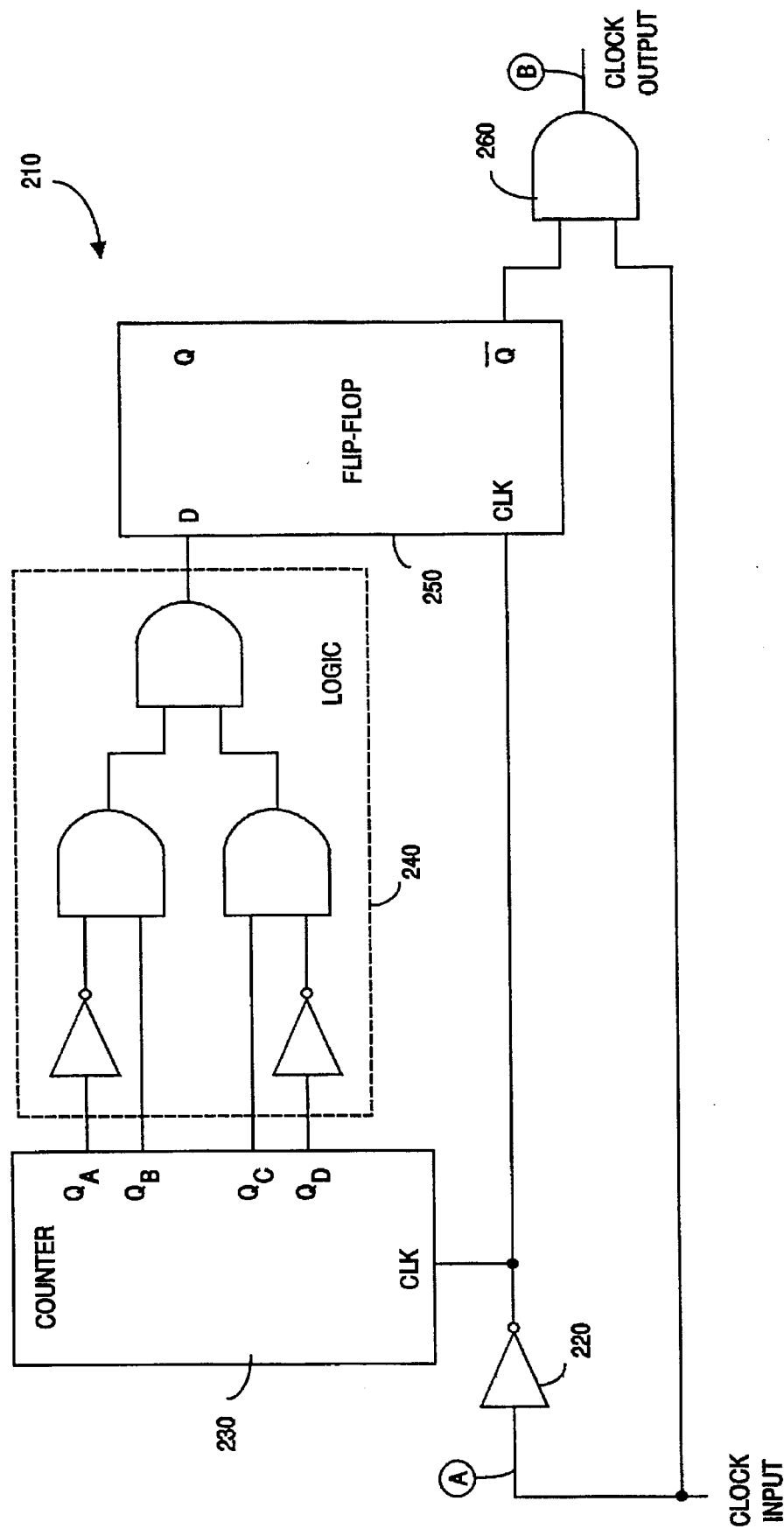
FIG. 4 is a schematic diagram of a clock dropper circuit used in a preferred embodiment of the present invention.

The panel clock signal generated by the present invention may be described as having two phases, each phase having frequency $f_c$. As shown in FIG. 5A-4, phase 1 represents a normal square-wave component. Phase 2 is similar to phase 1, but the pulses comprising phase 2 are phase shifted by $\phi$ relative to the pulses comprising phase 1.

Although the preferred embodiment creates a panel clock frequency having two phases, more than two phases may be created in other embodiments. However, there may be no advantage in doing so since it is the rate of change (Hz) between the phases rather than the number of phases that produces spectra spreading according to the present invention.

As shown by FIG. 5A-4, phase shift $\phi$ is 180° in the preferred embodiment because the clock dropper essentially removes a pulse, or a time period, in the clock dropper output waveform that represents 180° in the $f_c/N$ panel clock waveform. If divider unit 50 divided by ten instead of two, the period of time dropped by the clock dropper would, in the $f_c/10$ panel clock waveform, represent $\phi=36°$, and so on.

Figure 5B:
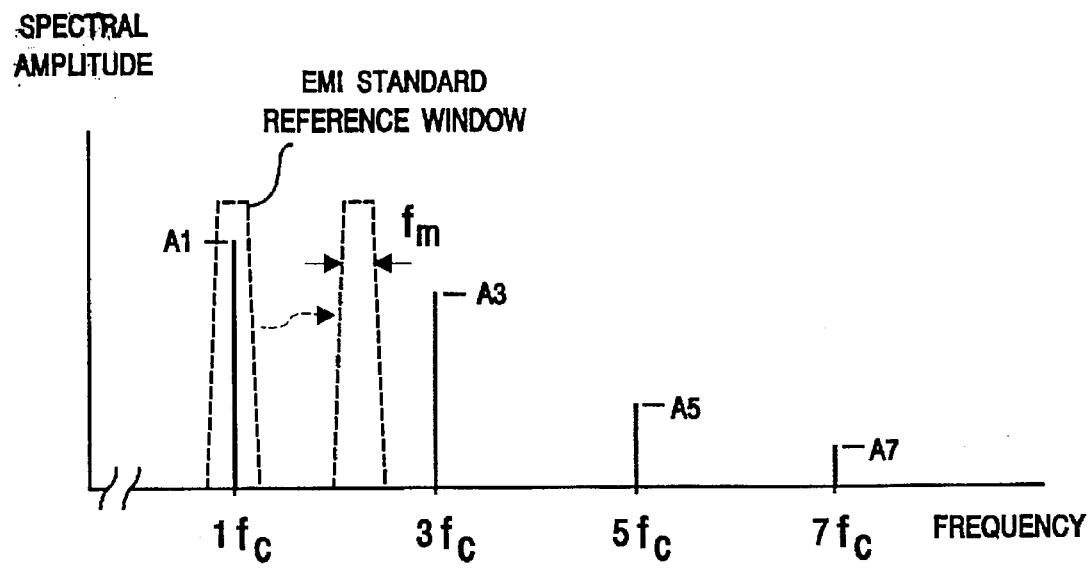
FIG. 5B is the frequency spectrum representation of FIG. 2B, according to the present invention.

Although the divide-by-N was implemented with a flip-flop (N=2) that produced $\phi=180°$, in practice any amount of phase shift $\phi>0°$ will suffice. With reference to FIG. 5B, a non-zero phase shift other than 180° will affect the relative amplitude of the sidebands. If it were readily feasible to implement the desired phase shift $\phi$ without dividing by N, flip-flop 50 could be replaced by such a phase modulating component. In such case, the input square-wave from main oscillator 40 could have frequency $f_c$ rather than $Nf_c$. However, as noted from the equation $\Delta f=Nf_c/(2M)$, it is the rate of change between the phases, and not the magnitude of the phase, that is important to the present invention, providing that $\phi>0$.

As a further consequence of implementing the divide-by-N with a flip-flop, each phase in FIG. 5A-4 has a 50% duty cycle. However, the two phases are not required to have the same duty cycle and in general phase 1 may have a duty cycle of J %, phase 2 a duty cycle of K %, where J+K=100. Again, what is important to the present invention is the rate of change between the two phases and not their duty cycles.

Figure 2A:
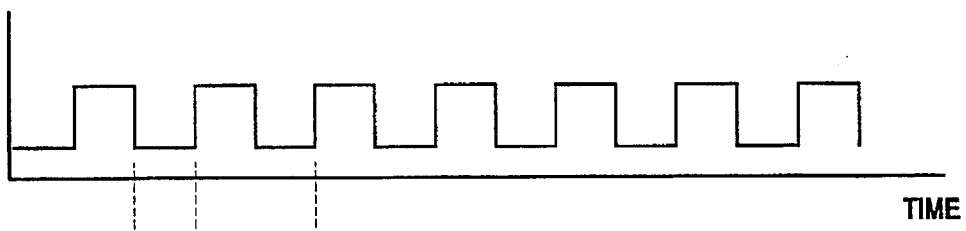
FIG. 2A depicts panel clock and pixel data signals as a function of time, according to the prior art.
Figure 2A:
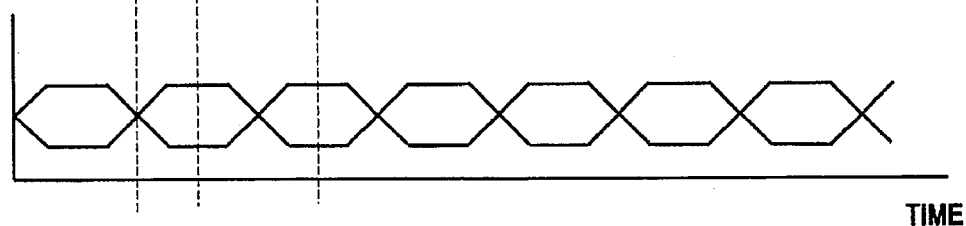

As shown in FIG. 5A-5, the DATA signal is clocked similarly to what was shown in FIG. 2A, namely changing state on the downward transition of the panel clock, and being valid during the upward transition of the panel clock.

The displayed position of each flat panel display pixel is determined solely by the number of panel clock pulses from a reference synchronization signal. Within the flat panel display, each pixel has a corresponding address, much like memory cells within a static random access memory unit. Each pixel location may be referred to directly by specifying its address coordinates. Alternatively, each pixel location may be referred to indirectly by specifying a starting location (e.g., top left of display), and sequentially addressing each location (e.g., scanning left-to-right).

The video data on bus 90 is updated only when clocked by the panel clock 70, with all timing and clocking information coming from timing generator 80. A wide variation in the change in period of the panel clock signal and thus the DATA signal is permitted. The data may be delayed almost arbitrarily providing the panel clock is identically delayed.

In the case of a flat panel display, a practical limitation in generating the panel clock signal is the rate at which the screen information is refreshed. If the panel clock is delayed too long, the information displayed on panel 10 may be refreshed too slowly, causing a user to perceive flicker and/or motion blurring. Within this constraint, however, great leeway exists with respect to generating an EMI-reducing panel clock signal, according to the present invention.

Figure 2B:
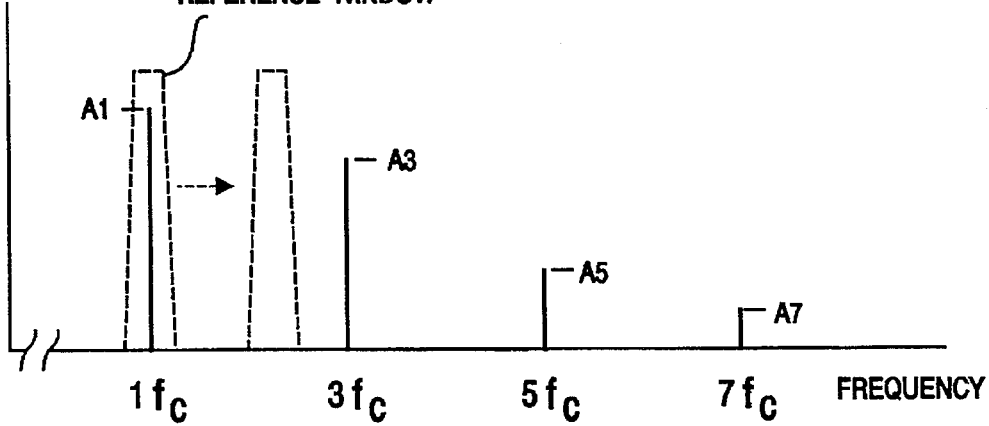
FIG. 2B is a frequency spectrum representation of the spectral contents of the panel clock and pixel data signals, according to the prior art.
Figure 5C:
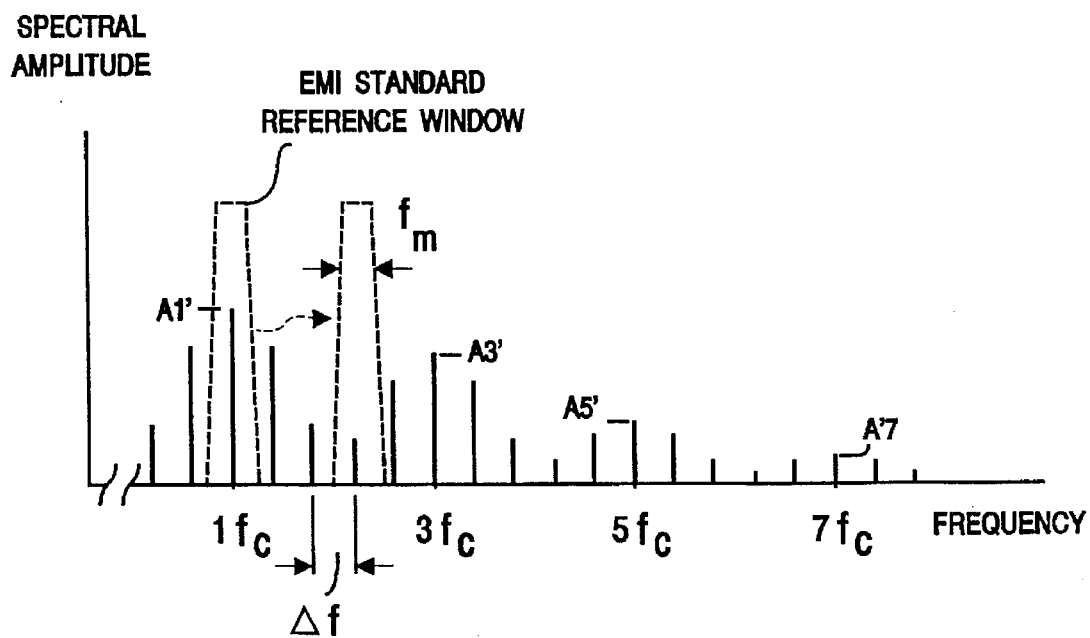
FIG. 5C is a frequency spectrum representation of the spectral contents of the panel clock and pixel data signals, according to the present invention.

For ease of comparison, FIG. 5B duplicates the prior art spectra shown in FIG. 2B, namely the relatively EMI-rich spectra associated with a prior art square-wave panel clock frequency. As shown by FIG. 5, in the Fourier transform of a panel clock signal according to the present invention, EMI energy-containing spectra are advantageously spread in the frequency domain. It is noted that the Fourier transforms depicted in FIGS. 5B and 5C may apply to the panel clock signals, and also to the DATA signals.

In FIG. 5C, if the panel clock has a frequency $f_c$, sidebands adjacent the harmonics of $f_c$ will be separated by a frequency amount $\Delta f = Nf_c/(2M)$. If the bandwidth of the EMI standard 120 KHz reference window is denoted $f_m$, the present invention will reduce measured EMI when $\Delta f > f_m$.

In the preferred embodiment, $f_c$ is 5 MHz, M=16, N=2. Thus the rate of change of the panel clock signal phases $\Delta f = Nf_c/(2M) = 2 \times 5 \text{ Mhz}/2 \times 16 = 312.5$ KHz. Thus, adjacent spectra will be separated by $\Delta f = 312.5$ KHz, which separation is greater than the $f_m = 120$ KHz measurement window.

Therefore, as the reference window sweeps horizontally in frequency (as indicated by the curved arrow in FIG. 5C), the measurement window captures relatively few spectral components at a time. Further, as shown in FIG. 5C the amplitude of each harmonic will be less than the amplitude associated with the corresponding same harmonic in the prior art spectral distribution of FIG. 5B.

Assume-that the panel clock signals whose Fourier transforms are shown in FIGS. 5B and 5C had equal voltage amplitude $A_{clock}$, for example 5 V peak-to-peak. In FIG. 5B, the spectral energy associated with $1f_c$ has an EMI amplitude A1. However, in FIG. 5C, the A1 quantum of EMI energy is distributed over $1f_c$ and $1f_c \pm k(Nf_c/2M)$ which is to say $1f_c \pm k(f_c/16)$, where k is an integer representing the sidebands (four of which are shown for each harmonic in FIG. 5C). Thus, the maximum amplitude of EMI energy associated with $1f_c$ is A1', which is less than prior art amplitude A1. Since the adjacent spectra are intentionally spread apart in frequency an amount $\Delta f > f_m$, the maximum measured spectra energy associated with $1f_c$ will be $\leq A1'$.

Whereas the spectral energy associated with the third harmonic in prior art FIG. 5B is A3, the A3 quantum of energy is dispersed in FIG. 5C around $3f_c$, $3f_c \pm k(Nf_c/2M)$. Thus, in FIG. 5C, the maximum EMI energy associated with $3f_c$ is A3', where A3'<A3. In like fashion, the spectral energy associated with each harmonic for a prior art square-wave panel clock frequency will be distributed in root-mean-square fashion about the corresponding harmonic in FIG. 5C. Again the result is that at any position of the EMI reference window along the frequency spectrum, less EMI energy is captured, and thus less EMI is present.

For ease of illustration FIG. 5C shows only seven harmonics, although it is understood that higher harmonics may also be present. Further, FIGS. 5B and 5C depict spectra for idealized panel clock signals. In reality, actual panel clock signals will have finite transition times and may have Fourier transforms that include even numbered harmonics. However, spectral energy associated with any even harmonics will also be distributed over frequency, according to the present invention. EMI will still be decreased, similarly to what has been described with respect to FIG. 5C for odd harmonics.

Implementation of the preferred embodiment has been described with respect to a clock swallowing circuit. However, a suitable amount of spectrum-spreading, EMI-reducing non-periodicity may be introduced into a panel clock signal using other techniques as well. For example, phase shifting may be introduced by passing the main oscillator signal through registers or delay lines. A delayed and an undelayed version of the main oscillator signal may then be combined, for example using a multiplex switch, to produce an appropriate clock dropper output signal.

Of course, rates of phase change in the panel clock signal other than what was described with respect to the preferred embodiment are acceptable. The critical requirement is that adjacent spectra in FIG. 5C are separated by a frequency amount $\Delta f$ greater than the EMI standard reference window $f_m$.

Applicants have measured relative EMI for a flat panel display, according to the present invention. In the measured display system, $f_c = 5$ MHz, M=8, N=2, $\phi = 180°$, and clock dropping was implemented using programmable array logic. In this system, the rate of phase change was $Nf_c/2M$ or 625 KHz, and measured EMI was −4 dB relative to 0 dB for a similar system using a conventional square-wave panel clock signal.

It will be appreciated that implementing a clock swallower or other phase shift circuit may be accomplished using off-the-shelf components. In the preferred embodiment, standard logic integrated circuits are used that require relatively little integrated circuit chip area, and that consume relatively little operating power.

Further, implementing the present invention can permit a relaxation of specifications for any low pass filters 130, ferrites 140, and/or shielding 160 that may also be used. As such, the present invention can reduce EMI without impacting system cooling.

Figure 6A:
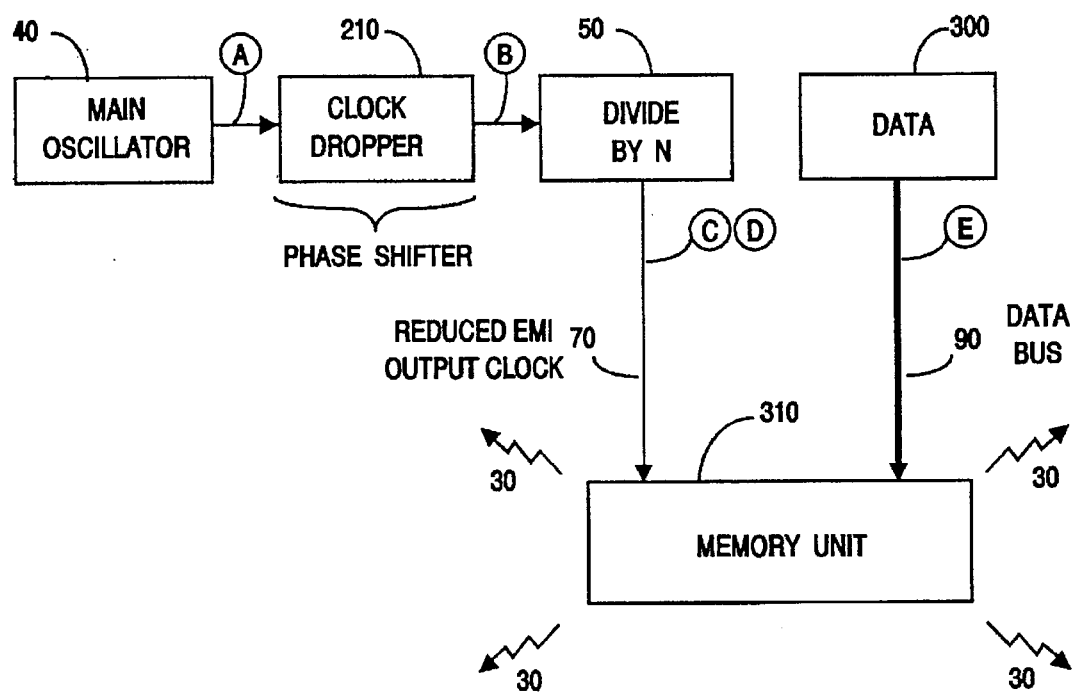
FIG. 6A depicts EMI reduction in a memory unit coupled to an output clock generated according to the present invention.

Those skilled in the art will further appreciate that EMI may be reduced according to the present invention in applications other than video display systems. For example, FIG. 6A depicts a source of data 300 coupled via a data bus 90 to a memory unit 310. The data is clocked into (or out of) memory unit 310 as a function of an output clock 70 that preferably is generated in the same manner as panel clock 70 in FIG. 3. As a result, while the memory unit may emit EMI 30, the magnitude of such EMI will be lower than if the output clock 70 were a square-wave.

Figure 6B:
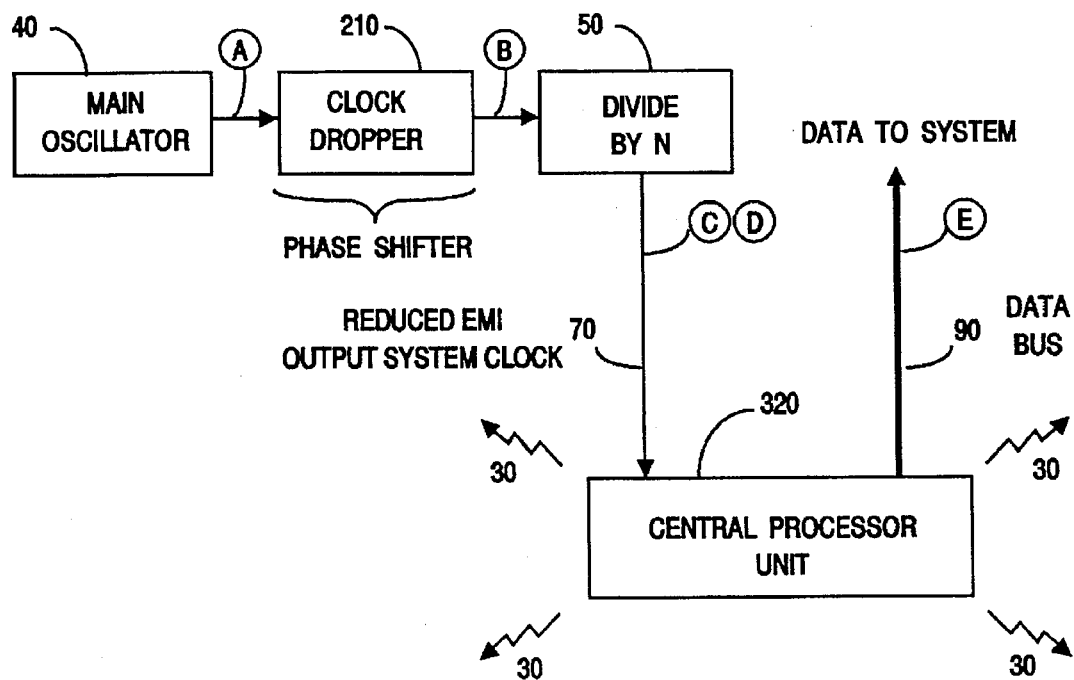
FIG. 6B depicts EMI reduction in a central processor unit coupled to a system output clock generated according to the present invention.

In FIG. 6B, a central processor unit 20 transfers (or receives) system data via a data bus 90. Such data is transferred as a function of an output system clock 70 that preferably is generated in the same manner as panel clock 70 in FIG. 3. While the central processor unit 320 may still emit EMI 30, the magnitude of this EMI will be lower than if the system clock 70 were a square-wave.

Modifications and variations may be made to the disclosed embodiments without departing from the subject and spirit of the invention as defined by the following claims.

What is claimed is:

1. A method for reducing emission of electromagnetic interference generated by an electronic component coupleable to an output clock signal having an amplitude $A_{clock}$ and a frequency $f_c$, the method comprising generating said output clock signal such that its Fourier transform includes sidebands adjacent at least first and third harmonics of $f_c$, wherein adjacent said sidebands are separated by a frequency amount $\Delta f$ exceeding an EMI standard reference bandwidth $f_m$;

wherein each of said first and third harmonics of $f_c$ has a respective amplitude less than a respective amplitude of first and third harmonics associated with a square-wave having amplitude $A_{clock}$ and frequency $f_c$.

2. The method of claim 1, further including the steps of:
   forming said output clock signal from a square-wave signal having frequency $Nf_c$;
   dropping at least every Mth pulse in said square-wave signal of frequency $Nf_c$ to form an intermediate clock signal;

frequency dividing by N and phase modulating said intermediate clock signal of frequency $Nf_c$ to generate said output clock signal having clock pulses comprising a first phase and clock pulses comprising a second phase, wherein said clock pulses comprising said second phase are phase shifted by $\phi > 0°$ relative to said clock pulses comprising said first phase;

wherein adjacent said sidebands are separated by $\Delta f = Nf_c/2M$.

3. The method of claim 2, wherein frequency dividing by N and phase modulating includes coupling said intermediate clock signal as input to a divide-by-two flip-flop;

wherein said output clock signal is an output of said divide-by-two flip-flop and wherein $\phi$ is $180°$.

4. The method of claim 2, wherein dropping at least every Mth pulse is accomplished with a clock dropper circuit including:

a counter coupled to receive said square-wave signal;

logic coupled to an output of said counter for recognizing a count of M; and a flip-flop coupled to receive said square-wave signal and to receive an output of said logic;

wherein said flip-flop outputs said intermediate clock signal.

5. The method of claim 1, wherein said electronic component includes a flat panel display, and wherein said output clock signal is a panel clock that clocks data into said flat panel display.

6. The method of claim 1, wherein said electronic component includes a memory unit, and wherein said output clock signal clocks data in communication with said memory unit.

7. The method of claim 1, wherein said electronic component includes a central processor unit, and wherein said output clock signal is a system clock coupled to said central processor unit.

8. A method for reducing emission of electromagnetic interference generated by a flat video display coupleable to a panel clock signal having an amplitude $A_{clock}$ and a frequency $f_c$, the method comprising generating said panel clock signal such that its Fourier transform includes sidebands adjacent at least first and third harmonics of $f_c$, wherein adjacent said sidebands are separated by a frequency amount $\Delta f$ exceeding an EMI standard reference bandwidth $f_m$;

wherein each of said first and third harmonics of $f_c$ has a respective amplitude less than a respective amplitude of first and third harmonics associated with a square-wave having amplitude $A_{clock}$ and frequency $f_c$.

9. The method of claim 8, further including the steps of:

forming said panel clock signal from a square-wave signal having frequency $Nf_c$;

dropping at least every Mth pulse in said square-wave signal of frequency $Nf_c$ to form an intermediate clock signal;

frequency dividing by N and phase modulating said intermediate clock signal of frequency $Nf_c$ to generate said output clock signal having clock pulses comprising a first phase and clock pulses comprising a second phase, wherein said clock pulses comprising said second phase are phase shifted by $\phi > 0°$ relative to said clock pulses comprising said first phase;

wherein adjacent said sidebands are separated by $\Delta f = Nf_c/2M$.

10. The method of claim 8, wherein frequency dividing by N and phase modulating includes coupling said intermediate clock signal as input to a divide-by-two flip-flop;

wherein said panel clock signal is an output of said divide-by-two flip-flop and wherein $\phi$ is $180°$.

11. The method of claim 9, wherein dropping at least every Mth pulse is accomplished with a clock dropper circuit including a counter coupled to receive said square-wave signal, logic coupled to an output of said counter for recognizing a count of M, and a flip-flop coupled to receive said square-wave signal and to receive an output of said logic, said flip-flop outputting said intermediate clock signal.

12. A system for reducing emission of electromagnetic interference generated by an electronic component coupleable to an output clock signal having an amplitude $A_{clock}$ and a frequency $f_c$ the system comprising:

an output clock generator that generates said output clock signal such that its Fourier transform includes sidebands adjacent at least first and third harmonics of $f_c$, wherein adjacent said sidebands are separated by a frequency amount $\Delta f$ exceeding an EMI standard reference bandwidth $f_m$;

wherein each of said first and third harmonics of $f_c$ has a respective amplitude less than a respective amplitude of first and third harmonics associated with a square-wave having amplitude $A_{clock}$ and frequency $f_c$.

13. The system of claim 12, wherein said output clock generator includes:

means, coupleable to a square-wave signal having frequency $Nf_c$, for dropping at least every Mth pulse in said square-wave signal of frequency $Nf_c$ to form an intermediate clock signal; and means for frequency dividing by N and phase modulating said intermediate clock signal of frequency $Nf_c$ to generate said output clock signal having clock pulses comprising a first phase and clock pulses comprising a second phase, wherein said clock pulses comprising said second phase are phase shifted by $\phi > 0°$ relative to said clock pulses comprising said first phase;

wherein adjacent said sidebands are separated by $\Delta f = Nf_c/2M$.

14. The system of claim 13, wherein said means for frequency dividing by N and phase modulating is a divide-by-N flip-flop whose flip-flop output is said output clock signal.

15. The system of claim 13, wherein said means for frequency dividing by N and phase modulating is a divide-by-two flip-flop whose flip-flop output is said output clock signal, wherein $\phi$ is $180°$.

16. The system of claim 13, wherein said means for dropping includes a clock dropper circuit.

17. The system of claim 16, wherein said clock dropper circuit includes:

a counter coupled to receive said square-wave signal;

logic coupled to an output of said counter for recognizing a count of M; and a flip-flop coupled to receive said square-wave signal and to receive an output of said logic;

wherein said flip-flop outputs said intermediate clock signal.

18. The system of claim 13, wherein said electronic component includes a flat panel display, and wherein said output clock signal is a panel clock that clocks data into said flat panel display.

19. The system of claim 13, wherein said electronic component includes a memory unit, and wherein said output clock signal clocks data in communication with said memory unit.

20. The system of claim 13, wherein said electronic component includes a central processor unit, and wherein said output clock signal is a system clock coupled to said central processor unit.

* * * * *

UNITED STATES PATENT AND TRADEMARK OFFICE
CERTIFICATE OF CORRECTION

PATENT NO. : 5,659,339
DATED : August 19, 1997
INVENTOR(S) : RINDAL et al.

It is certified that error appears in the above-identified patent and that said Letters Patent is hereby corrected as shown below:

Column 6, line 41, delete "bythe" and insert therefor --by the--.

Column 8, line 26, delete "inventi6n" and insert therefor --invention--.

Signed and Sealed this

Second Day of December, 1997

Attest:

BRUCE LEHMAN

*Attesting Officer*              *Commissioner of Patents and Trademarks*